United States Patent
Butler et al.

(10) Patent No.: US 10,746,937 B2
(45) Date of Patent: *Aug. 18, 2020

(54) ASSEMBLIES, OPTICAL CONNECTORS AND METHODS OF BONDING OPTICAL ELEMENTS TO SUBSTRATES

(71) Applicant: CORNING INCORPORATED, Corning, NY (US)

(72) Inventors: Douglas Llewellyn Butler, Painted Post, NY (US); Stephan Lvovich Logunov, Corning, NY (US); Mark Alejandro Quesada, Horseheads, NY (US); Alexander Mikhailovich Streltsov, Corning, NY (US); James Scott Sutherland, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,917

(22) Filed: Oct. 25, 2019

(65) Prior Publication Data

US 2020/0057202 A1 Feb. 20, 2020

Related U.S. Application Data

(63) Continuation-in-part of application No. 16/410,903, filed on May 13, 2019, now Pat. No. 10,545,293, (Continued)

(51) Int. Cl.
*G02B 6/36* (2006.01)
*G02B 6/42* (2006.01)
(Continued)

(52) U.S. Cl.
CPC ....... *G02B 6/3636* (2013.01); *G02B 6/02209* (2013.01); *G02B 6/30* (2013.01);
(Continued)

(58) Field of Classification Search
CPC ........ G02B 6/02209; G02B 6/30; G02B 6/32; G02B 6/3636; G02B 6/3861; G02B 6/4212; G02B 6/4238
See application file for complete search history.

(56) References Cited

U.S. PATENT DOCUMENTS

| | | | |
|---|---|---|---|
| 4,785,219 A | 11/1988 | Soemers et al. | |
| 5,389,193 A * | 2/1995 | Coucoulas | G02B 6/3652 216/24 |

(Continued)

FOREIGN PATENT DOCUMENTS

| | | |
|---|---|---|
| CN | 203109443 U | 8/2013 |
| GB | 2453945 A | 4/2009 |

(Continued)

OTHER PUBLICATIONS

Richter et al; "Ultrashort Pulse Induced Laser Welding of Glasses Without Optical Contacting"; Proc. of SPIE, vol. 10094; p. 1009411-1-1009411-8; (2017.
(Continued)

*Primary Examiner* — Daniel Petkovsek
(74) *Attorney, Agent, or Firm* — Grant A. Gildehaus

(57) ABSTRACT

Assemblies, optical connectors, and methods for bonding optical elements to a substrate using a laser beam are disclosed. In one embodiment, a method of bonding an optical element to a substrate includes disposing a film layer on a surface of the substrate, disposing the optical element on a surface of the film layer, and directing a laser beam into the optical element. The method further includes melting, using the diameter laser beam, a material of the substrate to (Continued)

create a bond area between the optical element and the surface of the substrate. The film layer is capable of absorbing a wavelength of the laser beam to melt the material of the substrate at the bond area. The bond area includes laser-melted material of the substrate that bonds the optical element to the substrate.

22 Claims, 13 Drawing Sheets

Related U.S. Application Data which is a continuation of application No. 15/897,823, filed on Feb. 15, 2018, now Pat. No. 10,345,533.

(51) Int. Cl.
*G02B 6/30* (2006.01)
*G02B 6/38* (2006.01)
*G02B 6/02* (2006.01)

(52) U.S. Cl.
CPC ......... *G02B 6/3628* (2013.01); *G02B 6/3861* (2013.01); *G02B 6/4212* (2013.01); *G02B 6/424* (2013.01); *G02B 6/4237* (2013.01); *G02B 6/4238* (2013.01); *G02B 6/4239* (2013.01)

(56) References Cited

U.S. PATENT DOCUMENTS

| | | | |
|---|---|---|---|
| 6,219,484 B1 | 4/2001 | Rhee et al. | |
| 6,411,759 B1 * | 6/2002 | Beguin | G02B 6/2551 385/49 |
| 6,440,776 B1 | 8/2002 | Musk | |
| 6,582,548 B1 * | 6/2003 | Dautartas | C03C 27/02 156/272.8 |
| 6,631,228 B2 | 10/2003 | Gao et al. | |
| 6,863,209 B2 | 3/2005 | Rinne et al. | |
| 7,505,650 B1 | 3/2009 | Grzybowski et al. | |
| 8,873,908 B2 | 10/2014 | Hu et al. | |
| 9,000,327 B2 | 4/2015 | Yoshikawa | |
| 9,515,286 B2 | 12/2016 | Dabich, II et al. | |
| 10,345,533 B1 * | 7/2019 | Logunov | G02B 6/02209 |
| 10,422,961 B2 * | 9/2019 | Logunov | G02B 6/3861 |
| 2002/0000427 A1 | 1/2002 | Akhavain et al. | |
| 2002/0069497 A1 * | 6/2002 | Musk | G02B 6/3636 29/25.01 |
| 2002/0110331 A1 * | 8/2002 | Farrelly | G02B 6/2552 385/51 |
| 2002/0136500 A1 | 9/2002 | Ratrix | |
| 2003/0235388 A1 * | 12/2003 | Lee | G02B 6/3839 385/137 |
| 2007/0201797 A1 * | 8/2007 | Grzybowski | B29D 11/00384 385/52 |
| 2012/0045169 A1 | 2/2012 | U et al. | |
| 2013/0170789 A1 | 7/2013 | Uang | |
| 2014/0377988 A1 | 12/2014 | Vaccaro et al. | |
| 2015/0222070 A1 * | 8/2015 | Morimoto | B23K 1/0056 29/860 |
| 2016/0054216 A1 | 2/2016 | Sokol et al. | |
| 2016/0268541 A1 | 9/2016 | Dabich, II et al. | |
| 2017/0216971 A1 | 8/2017 | Demuth et al. | |
| 2019/0271814 A1 * | 9/2019 | Logunov | G02B 6/02209 |

FOREIGN PATENT DOCUMENTS

| | | |
|---|---|---|
| JP | 2002022995 A | 1/2002 |
| WO | 2016209890 A1 | 12/2016 |
| WO | 2017035106 A1 | 3/2017 |
| WO | 2017040475 A1 | 3/2017 |

OTHER PUBLICATIONS

Shen, Ninggang et al., "Selective Laser Melting of Fiber-Reinforced Glass Composites", Mnfg Letters, vol. 14, Oct. 2017, pp. 6-9, found at https://www.sciencedirect.com/science/article/pii/S2213846317300202 (Oct. 2017).

International Search Report and Written Opinion of the International Searching Authority; PCT/US2019/017803; dated May 16, 2019; 13 Pages; European Patent Office.

* cited by examiner

ASSEMBLIES, OPTICAL CONNECTORS AND METHODS OF BONDING OPTICAL ELEMENTS TO SUBSTRATES

CROSS-REFERENCE TO RELATED APPLICATIONS

The present application is a continuation-in-part of U.S. Pat. No. 10,545,293, filed on May 13, 2019 and entitled "ASSEMBLIES, OPTICAL CONNECTORS AND METHODS OF BONDING OPTICAL FIBERS TO SUBSTRATES," which is a continuation of U.S. Pat. No. 10,345,533, filed on Feb. 15, 2018 and entitled "ASSEMBLIES, OPTICAL CONNECTORS AND METHODS OF BONDING OPTICAL FIBERS TO SUBSTRATES," both of which are incorporated by reference herein in their entirety.

BACKGROUND

The present disclosure generally relates to methods for securing optical elements to substrates and, more particularly methods for bonding optical elements to substrates using a laser beam, and optical connectors and assemblies comprising optical elements bonded to substrates using a laser beam.

Benefits of optical communication include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connectors are employed in both optical cable assemblies and electronic devices to provide an optical-to-optical connection wherein optical signals are passed between an optical cable assembly and an electronic device.

Optical devices, such as optical connectors, may include optical elements secured to a substrate. For example, an optical connector may include optical fibers secured to a substrate by use of an adhesive, which may have a high coefficient of thermal expansion. The optical connectors may then be connected to another optical device to provide optical communication between optical devices. In one example, the optical connector is connected to an edge of a waveguide substrate having waveguides providing optical channels. The waveguide substrate may be a component of a photonic integrated circuit assembly, for example. In some cases, the connected optical connector and the optical device may be subjected to elevated temperatures, such as during a solder reflow process. The high CTE adhesive may cause the position of the optical elements to shift due to the elevated temperatures and become misaligned with the optical channels of the optical device. The shifting of the optical elements may prevent optical signals from passing between the optical connector and the optical device.

SUMMARY

Embodiments of the present disclosure are directed to methods for bonding one or more optical elements, such as optical fibers, gradient-index (GRIN) lenses, micro-lenses, waveguides, optical filters, and the like, to a substrate using a laser beam, as well as optical connectors and assemblies resulting from said methods. In one example, the optical element is a curved element, such as a GRIN lens, a micro-lens or an optical fiber, that acts as a cylindrical lens to focus the laser beam into the substrate. The focused laser beam melts the substrate material, which also causes the melted substrate material to diffuse into the material of the optical element. Thus, the optical element is bonded to the substrate using a laser welding process. The cylindrical lens provided by the curved optical element may eliminate the need to have a complicated optical delivery system to locally focus the laser beam into the substrate material. Optical connectors and assemblies comprising one or more optical elements bonded to a substrate using a laser beam are also disclosed.

In one embodiment, a method of bonding an optical element to a substrate includes disposing a film layer on a surface of the substrate, disposing the optical element on a surface of the film layer, and directing a laser beam into the optical element. The method further includes melting, using the diameter laser beam, a material of the substrate to create a bond area between the optical element and the surface of the substrate. The film layer is capable of absorbing a wavelength of the laser beam to melt the material of the substrate at the bond area. The bond area includes laser-melted material of the substrate that bonds the optical element to the substrate.

In another embodiment, a method of bonding a gradient-index (GRIN) lens to a substrate includes disposing a film layer on a surface of the substrate and disposing the GRIN lens on a surface of the film layer. The method further includes directing a laser beam into the GRIN lens, wherein the GRIN lens has a curved surface and the curved surface focuses the laser beam to a focused diameter that is smaller than an initial diameter of the laser beam when the laser beam entered the GRIN lens. The method further includes melting, using the focused diameter laser beam, a material of the substrate to create a bond area between the GRIN lens and the surface of the substrate. The film layer is capable of absorbing a wavelength of the laser beam to melt the material of the substrate at the bond area, and the bond area has laser-melted material of the substrate that bonds the GRIN lens to the substrate.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Figure 1:
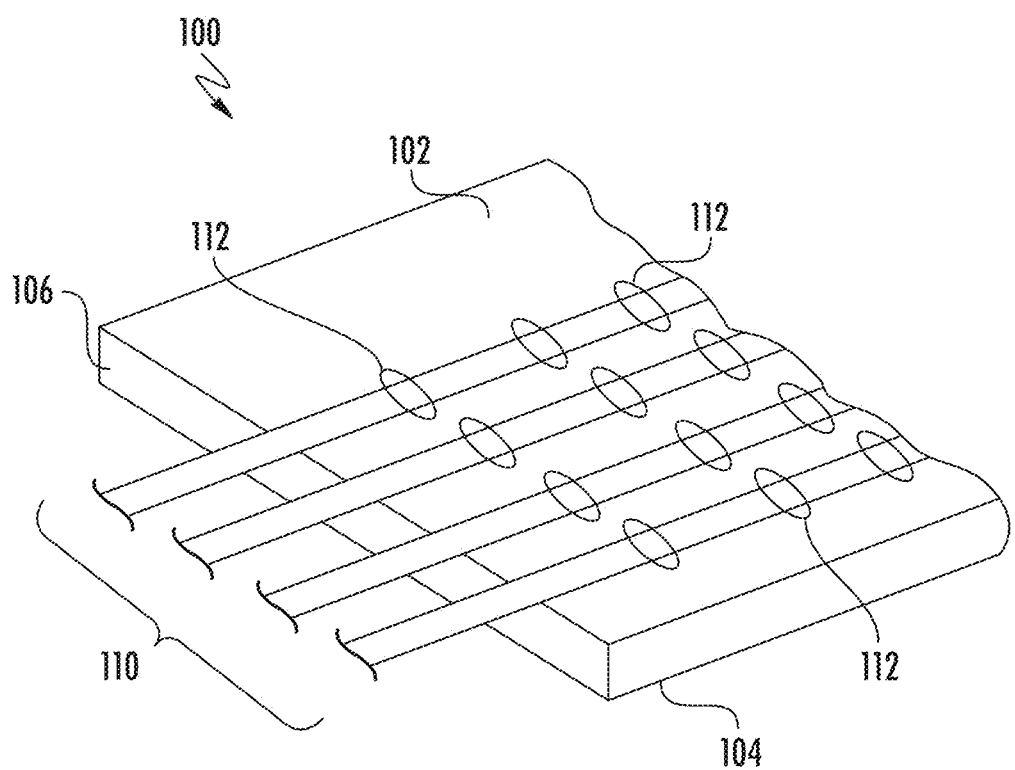
FIG. 1 schematically depicts a perspective view of an assembly comprising a plurality of curved optical elements bonded to a substrate by a laser welding process according to one or more embodiments described and illustrated herein.

Embodiments described herein are directed to methods for bonding optical elements to substrates using a laser beam, as well as optical connectors and assemblies including optical elements bonded to substrates using a laser beam. Embodiments of the present disclosure enable optical elements, which may have a curved shape, to be bonded to a flat substrate without the use of adhesives having a high coefficient of thermal expansion (CTE). It may be desirable to subject an optical connector incorporating optical elements secured to a substrate to a high temperature process, such as a solder reflow process. As an example and not a limitation, a connector may be attached to an optical assembly, such as an edge of a waveguide substrate of a photonic integrated circuit assembly. The photonic integrated circuit assembly and a main circuit board may be subjected to a solder reflow process after the connector is attached to waveguide substrate of the photonic integrated circuit assembly. For effective optical communication between the optical connector and the optical channels of the photonic integrated circuit assembly (or other optical assembly), optical elements, such as optical fibers, should be aligned to the optical channel of the photonic integrated circuit assembly with sub-micron accuracy. If a high-CTE adhesive is used to secure the optical elements to the substrate of the optical connector, the elevated temperatures of the solder reflow process may cause expansion of the high-CTE adhesive. This may then cause the optical elements to move, which can then cause the optical elements to become misaligned with respect to the optical channels of the photonic integrated circuit assembly (or other optical assembly).

Embodiments of the present disclosure provide for a fixed attachment procedure that does not rely on high-CTE adhesives and enables the optical elements and substrate to be subjected to elevated temperatures, such as a solder reflow process.

Optical elements as used herein encompasses optical components capable of propagating optical signals in the form of light. Optical elements described herein may include curved optical elements, such as, without limitation, optical fibers, gradient-index (GRIN) lenses, optical fiber stubs, cylindrical waveguides, convex lenses, and concave lenses. A "curved optical element" according to this disclosure is an optical element that includes at least one curved outer surface intended to be bonded to a substrate. Optical elements described herein may also include planar optical elements, such as planar waveguides (i.e., a planar waveguide substrate having optical waveguides configured to propagate optical signals), optical filters operable to filter properties of light, such as polarization and wavelength, or active optical components, such as photodiodes and lasers and/or light emitting diodes. A "planar optical element" according to this disclosure is an optical element that includes at least one planar surface intended to be bonded to a substrate.

In embodiments wherein the optical element is a curved optical element, a laser beam is focused by the curved surface of the optical element such that a focused diameter of the laser beam is smaller at a contact area between the optical element and the substrate than the initial diameter of the laser beam. A film layer may be provided on a surface of the substrate that absorbs the laser beam, causing the surface of the substrate to melt. The material of the substrate diffuses into the material of the optical element, thereby causing the optical element to be bonded to the substrate. Thus, the embodiments described herein enable the bonding of geometrically different components (e.g., curved optical fibers to a flat substrate) using dissimilar materials (e.g., fused silica optical fibers and a glass substrates). As used herein, the term "melt" means that the material is modified by heating in any manner that bonds the optical element to the substrate, and includes, but is not limited to, actual melting of the material as well as visco-elastic swelling of the material.

Various embodiments of methods for bonding optical elements to substrates using a laser and assemblies comprising a plurality of optical elements bonded to a substrate are described in detail herein.

Referring now to FIG. 1, a partial perspective view of a substrate 100 with a plurality of optical elements 110 (shown in FIG. 1 as a plurality of optical fibers) bonded thereto is schematically depicted. It should be understood that the optical elements 110 shown in FIG. 1 may also be configured as other curved optical elements, such as gradient-index (GRIN) lenses, optical fiber stubs, cylindrical waveguides, convex lenses, and concave lenses.

Figure 11:
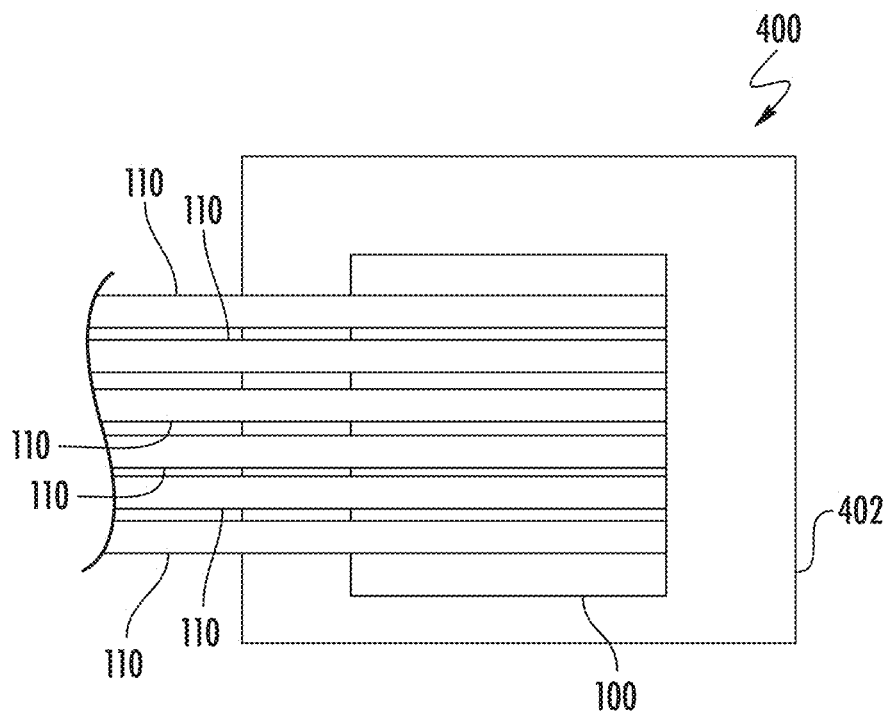
FIG. 11 schematically depicts a connector having an assembly comprising a plurality of optical elements bonded to a substrate by a laser welding process according to one or more embodiments described and illustrated herein.

As an example and not a limitation, the substrate 100 and the plurality of optical elements 110 may be incorporated into an optical connector (e.g., a fiber optic connector), as illustrated schematically in FIG. 11. For example, the optical connector 400 may include a housing 402 and the substrate 100 and at least a portion of the optical elements 110 may be located in the housing 402. It should be understood that embodiments described herein are not limited to optical connectors. The optical elements and substrate assemblies may be incorporated into other optical devices.

The example substrate 100 depicted in FIG. 1 comprises a first surface 102, a second surface 104 opposite the first surface 102 and at least one edge 106 extending between the first surface 102 and the second surface 104. The substrate may be made of any low melting temperature material capable of diffusing into the material of the optical element 110. Generally, the melting temperature of the substrate 100 should be lower than the melting temperature of the optical element. An example non-limiting material for the optical element 110 is fused silica. Example materials for the substrate 100 include, but are not limited to, glass, silica, and silicon. Non-limiting glass materials include alkaline earth boro-aluminosilicate glass (e.g., as manufactured and sold under the trade name Eagle XG® by Corning Incorporated of Corning, N.Y.) and alkali-aluminosilicate glass (e.g., as manufactured and sold by Corning Incorporated of Corning, N.Y. under the trade name Gorilla® Glass). As non-limiting examples, the softening point for Eagle XG® is about 970 C. Other non-limiting examples of glass include BK7 glass, soda lime and other glasses with flat or polished surfaces. For such glasses, the softening point may be within a range of about 650 C to about 800 C, including endpoints. The softening point for fused silica is about 1715 C, so any glass with softening point less than 1500-1600 C may be acceptable. It should be understood that the substrate 100 may be made of other low-melting temperature materials.

The thickness of the substrate 100 is not limited by this disclosure. The thickness of the substrate 100 may be any thickness as desired for the end-application of the optical element 110 and substrate 100 assembly.

The plurality of optical elements 110 are bonded to the first surface 102 of the substrate 100 by one or more laser bonding processes as described in detail below. If needed, the optical elements 110, if configured as optical fibers, are stripped of any jacket or outer layers to remove high CTE material. Although FIG. 1 depicts four optical elements 110, it should be understood that any number of optical elements 110 may be bonded to a surface of the substrate 100 (i.e., one or more optical elements 110). It should also be understood that the optical elements 110 may be bonded to the second surface 104, or both the first surface 102 and the second surface 104.

The optical elements 110 may be fabricated from any material having a higher melting temperature than that of the substrate 100. As noted above, the optical elements 110 may be fabricated from fused silica. The optical elements 110 have a round shape in cross section. However, the optical elements 110 may be elliptical in shape, semi-spherical in shape, or have any curved surface. As described in more detail below, the optical elements 110 may have at least one curved surface that focus a laser beam to a focused diameter such that a size (e.g., a diameter) of the laser beam at the contact area between the optical element 110 and the first surface 102 of the substrate 100 is smaller than a size of the initial diameter of the laser beam as it enters the optical element 110.

Each optical element 110 is bonded to the first surface 102 of the substrate 100 at one or more bond areas 112 (also called a bond area or an additional bond area) along the length of the optical element 110. It is noted that the bond areas 112 are denoted by ellipses in FIG. 1. As described in detail below, the bond areas 112 are regions of the first surface 102 of the substrate 100 where the optical element 110 contacts the first surface 102 of the substrate 100 and the material of the substrate 100 is laser-melted (i.e., melting caused by a laser beam) and diffused into the material of the optical element 110. The bond areas 112, which includes laser-melted material caused by the application of a laser beam, weld the optical element 110 to the first surface 102. It is noted that, in some embodiments, heating of a contact area 113 between optical element 110 and the first surface 102 of the substrate 100 may be provided by application of electromagnetic energy (e.g., microwaves) rather than a laser beam.

Any number of bond areas 112 may be provided along the length of the optical element 110. Bonding the optical elements 110 to the surface of the substrate 100 eliminates the need for high CTE adhesives or organic materials, such as epoxy, to secure the optical elements 110 to the substrate 100. Therefore, the assembly of the substrate 100 and the optical elements 110 may be subjected to elevated temperatures of a solder reflow process without movement of the optical elements 110 due to the presence of high CTE epoxy or other high CTE material.

Figure 2:
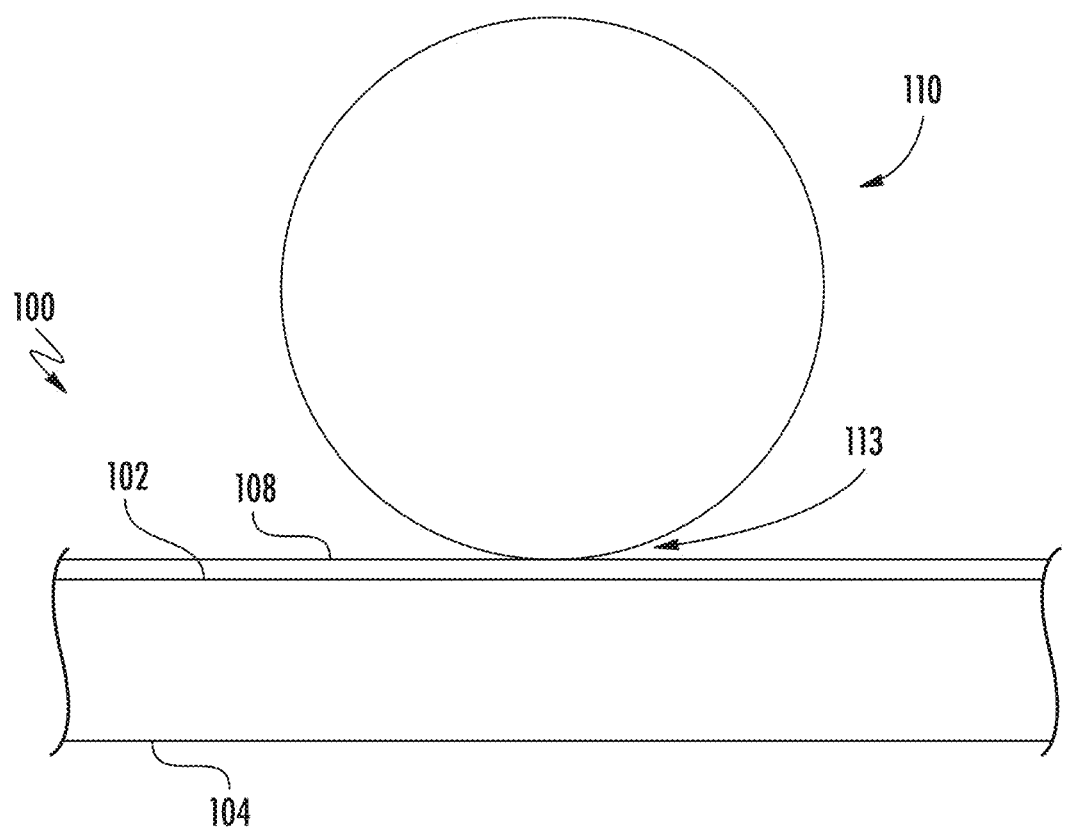
FIG. 2 schematically depicts an end view of a curved optical element positioned on a film layer disposed on a surface of a substrate according to one or more embodiments described and illustrated herein.

Referring now to FIGS. 2-5, an example process for laser welding curved optical elements 110, such as optical fibers, to a substrate 100 is schematically illustrated. Referring first to FIG. 2, an end view of an optical element 110 disposed on a substrate 100 is schematically depicted. A film layer 108 is deposited on the first surface 102 (or the second surface 104). The film layer 108 is configured to absorb a wavelength of the laser beam, and raise the temperature of the first surface 102 to locally heat and melt the substrate 100, as described in more detail below and illustrated in FIGS. 3 and 4. The material of the film layer 108 should be chosen such that it is absorptive to the wavelength of the laser beam. As a non-limiting example, the film layer 108 may have an absorbance of greater than or equal to 10% as measured by reflectance and transmission of the sample. The absorbance is calculated as 100% minus the transmission value minus the reflectance value.

The thickness of the film layer 108 is not limited by this disclosure. It is noted that the thickness of the film layer 108 is exaggerated in FIGS. 2 and 4 for illustrative purposes. As a non-limiting example, the thickness of the film layer 108 may be less than or equal to 1 µm. In other embodiments, the thickness of the film layer 108 may be less than or equal to about 1.5 µm. Non-limiting materials for the film layer 108 include metals (e.g., stainless steel), glasses (e.g., low melting glass (LMG)), ZnO, $TiO_2$, $Nb_2O_5$), an electromagnetic-absorbing oxide material, and an electromagnetic-absorbing nitride material, among others. The material and thickness of the film layer 108 should be such that the material of the substrate 100 at the first surface 102 melts due to the absorption of the laser beam by the film layer 108.

Still referring to FIG. 2, a curved optical element 110 is disposed on the film layer 108 such that a contact area 113 is defined by contact between the optical element 110 and the film layer 108. The contact area 113 generally extends along the length of the optical element 110 that it is in contact with the film layer 108. It is noted that, in some embodiments, no film layer 108 is provided and the optical element(s) 110 is disposed directly on the first surface 102 (and/or second surface 104) of the substrate 100.

Figure 3:
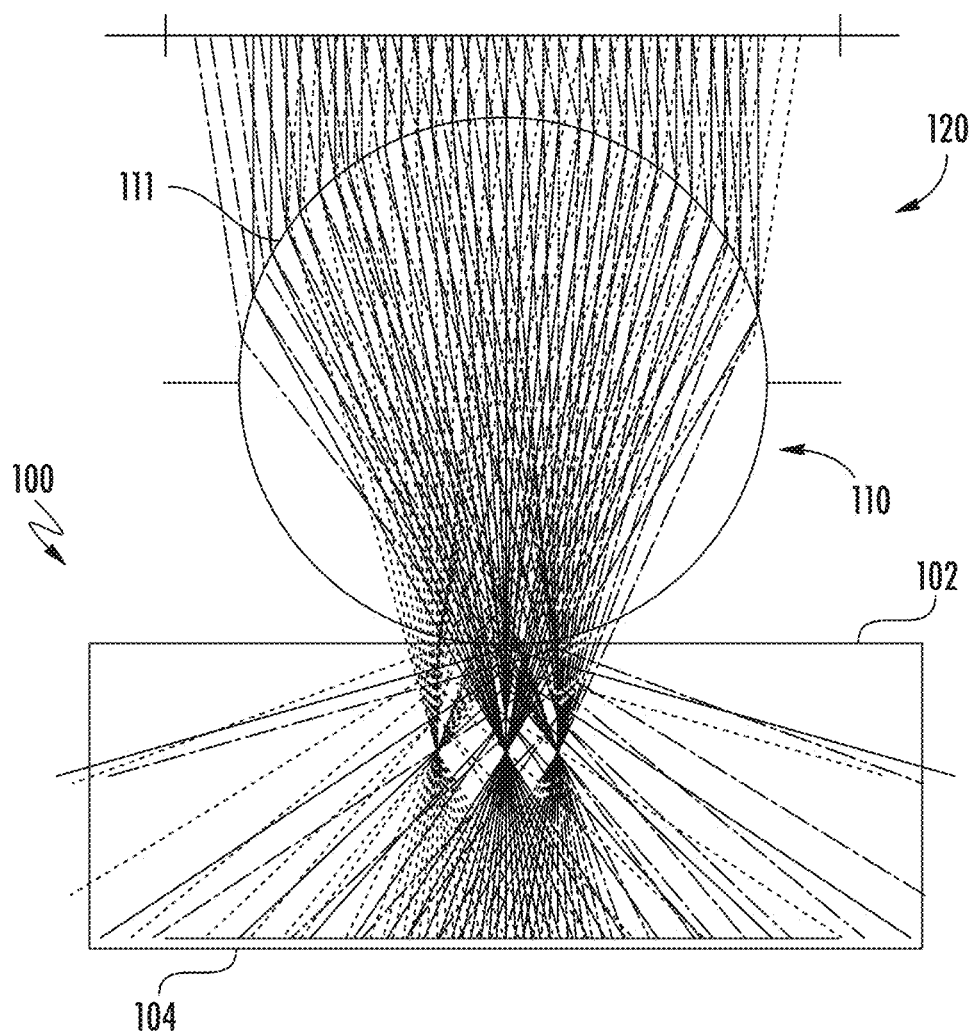
FIG. 3 schematically depicts ray tracing of light of a laser beam focused by the curved optical element depicted by FIG. 2 according to one or more embodiments described and illustrated herein.

The optical element 110 has a curved surface, and has a generally circular shape. The shape of the optical element 110 enables the optical element 110 to act as a cylindrical lens that focuses an incident laser beam 120 at the contact area 113 without a complicated optical delivery system. Referring now to FIG. 3, the example optical element 110 of FIG. 2 is shown having a laser beam 120 passing therethrough. The incident laser beam 120 is weakly focused as it enters the optical element 110. The curved upper surface 111 of the optical element 110 that receives the laser beam 120 focuses the laser beam 120 to a focused diameter at the contact area 113 that is smaller than a size (e.g., diameter) of the initial diameter of the laser beam 120 as the laser beam 120 enters the optical element 110 (i.e., at the upper surface 111 of the optical element 110). It is noted that the different line types depicting the ray-tracing of the laser beam 120 correspond to different input angles of the coherent laser beam due to the numerical aperture of the focusing lens (not shown). Thus, FIG. 3 schematically depicts how the optical element 110 acts as a cylindrical lens that focuses the laser beam, thereby reducing the size of the laser beam at the contact area 113 without the need for complicated optics. The reduction in size of the laser beam causes the film layer 108 to be heated quickly and provide the formation of a bond area proximate the contact area 113 (FIG. 2).

The properties of the laser beam 120 should be such that the laser beam melts the material of the substrate 100 at the contact area 113, thereby causing diffusion between the material of the optical element 110 and the material of the substrate 100. The laser beam may be a continuous wave (CW) or quasi CW laser beam (i.e., a pulsed laser beam having a high repetition rate). The wavelength of the laser beam 120 should be such that the laser beam 120 is absorbed by the film layer 108 to melt the material of the substrate 100. For example, the wavelength of the laser beam 120 may be in the visible, ultraviolet or near infrared spectral bands. As a non-limiting example, the wavelength of the laser beam 120 may be within a range of about 0.3 to about 1.7 µm, including endpoints.

In some embodiments, a single mode laser source is used to generate the laser beam 120 and the laser beam 120 may be in a range of about 0.5 W to about 10 W including endpoints, and be single mode for focusing by the optical element 110. The initial diameter of the laser beam 120 at the upper surface 111 of the optical element 110 should be equal to or less than the diameter of the optical element 110. In some embodiments, for example, the initial diameter of the laser beam is between about 80 µm and about 400 µm, including endpoints. The duration of time that the laser beam 120 is focused by the optical element 110 should be long enough to melt the material of the substrate 100 and to form a bond between the optical element 110 and the substrate 100. In some embodiments, the focal point of the laser beam is on the surface of the substrate.

As noted above, in some embodiments, no film layer is utilized to absorb the laser beam. In some embodiments, a high-power sub-picosecond pulsed laser (i.e., a laser having a pulse duration of less than about 1 picosecond) is used without an absorbing film layer. The high-energy pulses melt the material of the substrate 100 without a need for the absorbing film layer. Due to the material non-linearity and multiphoton absorption process, absorption occurs without an absorbing film. Non-limiting example power values of a sub-picosecond pulsed laser include a power density more than about 0.5 GW/cm$^2$ with an average power of greater than about 200 mW.

Figure 4:
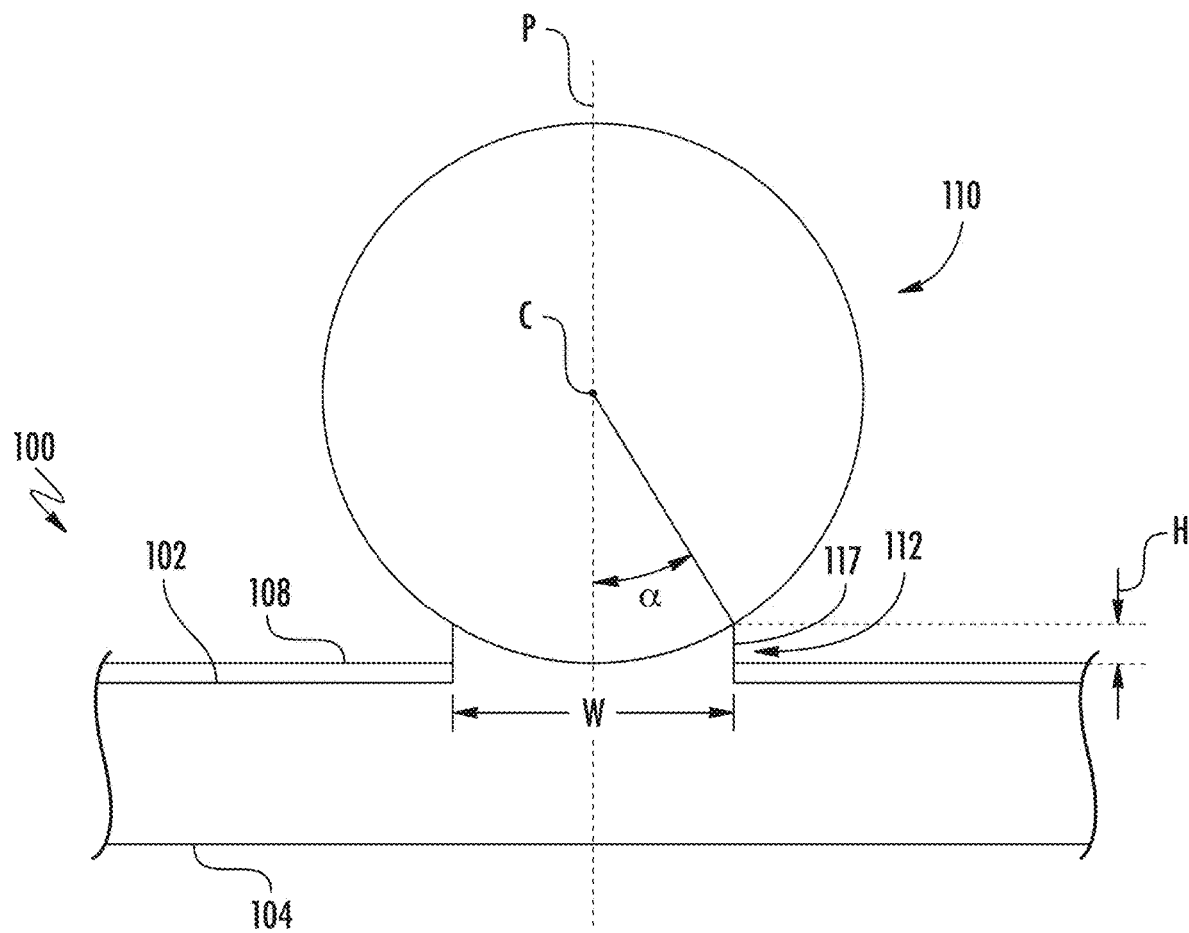
FIG. 4 schematically depicts the curved optical element bonded to the substrate depicted by FIG. 2 using a laser beam according to one or more embodiments described and illustrated herein.

FIG. 4 schematically depicts the optical element 110 after it is laser welded to the first surface 102 of the substrate 100 by the laser beam 120. Particularly, FIG. 4 depicts the topography of a bond area 112 that bonds the optical element 110 to the substrate 100. The film layer 108 absorbs a wavelength of the laser beam 120, which creates heat that causes the material of the substrate 100 to melt at the contact area 113 (FIG. 2). The melted material of the substrate 100 diffuses into the optical element 110, and also flows toward the optical element 110, thereby forming a bond area 112 having a height H as measured from the surface of the film layer 108 (or the first surface 102 of the substrate 100 in embodiments in which a film layer is not used) to an edge 117 of the bond area 112 that contacts the optical element 110. The height H of the bond area 112 is not limited by this disclosure. As an example and not a limitation, the height H of the bond area 112 may be about 0.2 µm to about 10 µm including end points.

The width W of the bond area 112 is dependent on the diameter of the laser beam 120 after the laser beam 120 is focused by the optical element 110 (also called the focused diameter of the laser beam). Additionally, an angle α is defined between a plane P through a center C of the optical element 110 and an edge 117 of the bond area 112. The value of the angle α depends on the height H and the diameter of the optical element. As a non-limiting example, for a range of the height H may be from about 0.2 µm to about 10 µm and a range of optical element diameter from about 80 µm to 400 µm, the range of α is from about 2.6 degrees to about 40 degrees.

As shown in FIG. 4, the bond area 112 is a region of expanded glass that creates a recess matching the shape of the optical element 110 and providing significant contact area with the optical element 110. This contact area increases the bonding strength of the optical element 110 to the first surface 102 of the substrate 100.

Figure 5:
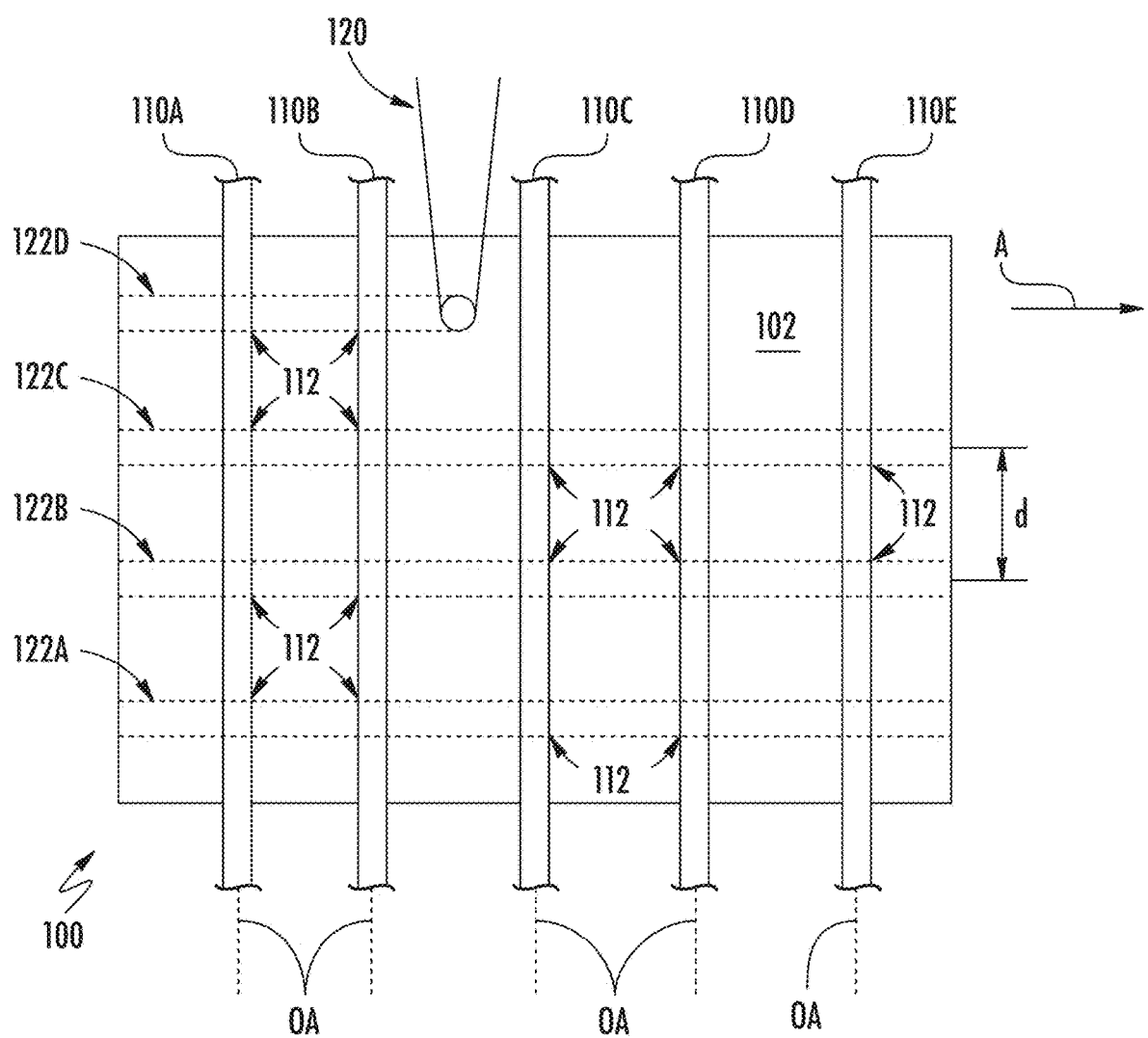
FIG. 5 schematically depicts a top down view of a plurality of curved optical elements being bonded to a substrate by a plurality of passes of a laser beam according to one or more embodiments described and illustrated herein.

Multiple optical elements 110 may be welded to the first surface 102 (and/or the second surface 104) of the substrate 100 to increase bonding strength. FIG. 5 schematically depicts a top-down view of optical elements 110A-110E disposed on a first surface 102 of a substrate 100. The optical elements 110A-110E are placed on the surface 102 of the substrate 100. The laser beam 120 or substrate is then moved (or translated) in a first direction (e.g., direction A) that is transverse to a longitudinal axis OA of the optical elements 110A-110E such that the laser beam passes over the optical elements 110A-110E to form bond areas 112. In the example of FIG. 5, the direction A of the laser beam 120 is perpendicular to the longitudinal axis OA of the optical elements 110A-110E. However, embodiments are not limited thereto. It is noted that the laser beam 120 may be translated relative to the substrate 100, or the substrate 100 may be translated relative to the laser beam 120.

The laser beam 120 sequentially traverses and welds multiple optical elements 110A-110E as it travels along direction A in a first pass 122A. As the laser beam 120 enters an optical element 110A-110E, it is focused as described above and creates a bond area 112. In some embodiments the material of the substrate 100 outside of the contact areas between the optical elements 110A-110E and the substrate 100 is not melted by the laser beam 120. Rather, material is only melted at the contact areas (e.g., contact area 113 as shown in FIG. 2) because of the focusing effect of the optical elements 110A-110E on the laser beam 120.

As shown in FIG. 5, multiple passes 122A-122D of the laser beam 120 may be performed to weld the optical elements 110A-110E (e.g., optical fibers) to the substrate 100 at multiple bond areas 112 along the length of the optical elements 110A-110E. For example, a position of the laser beam 120 or the substrate 100 may be shifted by a distance d in a direction parallel to the longitudinal axis OA of the optical elements 110A-110E after completion of a pass (e.g., the first pass 122A) to translate in a second direction to perform a subsequent pass (e.g., the second pass 122B) that may also be transverse to the longitudinal axis A of the optical elements 11A-110E. The distance d is not limited by this disclosure, and may depend on the desired number of bond areas 112 desired for each optical element 110A-110E. After shifting the position of the laser beam 120 or the substrate 100, the laser beam 120 or the substrate 100 is again translated traverse to the longitudinal axis OA of the optical elements 110A-110E. In FIG. 5, a fourth pass 122D is not yet complete as the laser beam 120 approaches a third optical element 110C. As a non-limiting example, the translation speed of the laser beam 120 with respect to the substrate 100 is in the range of about 5 mm/s to 200 mm/s, including endpoints.

Figure 6:
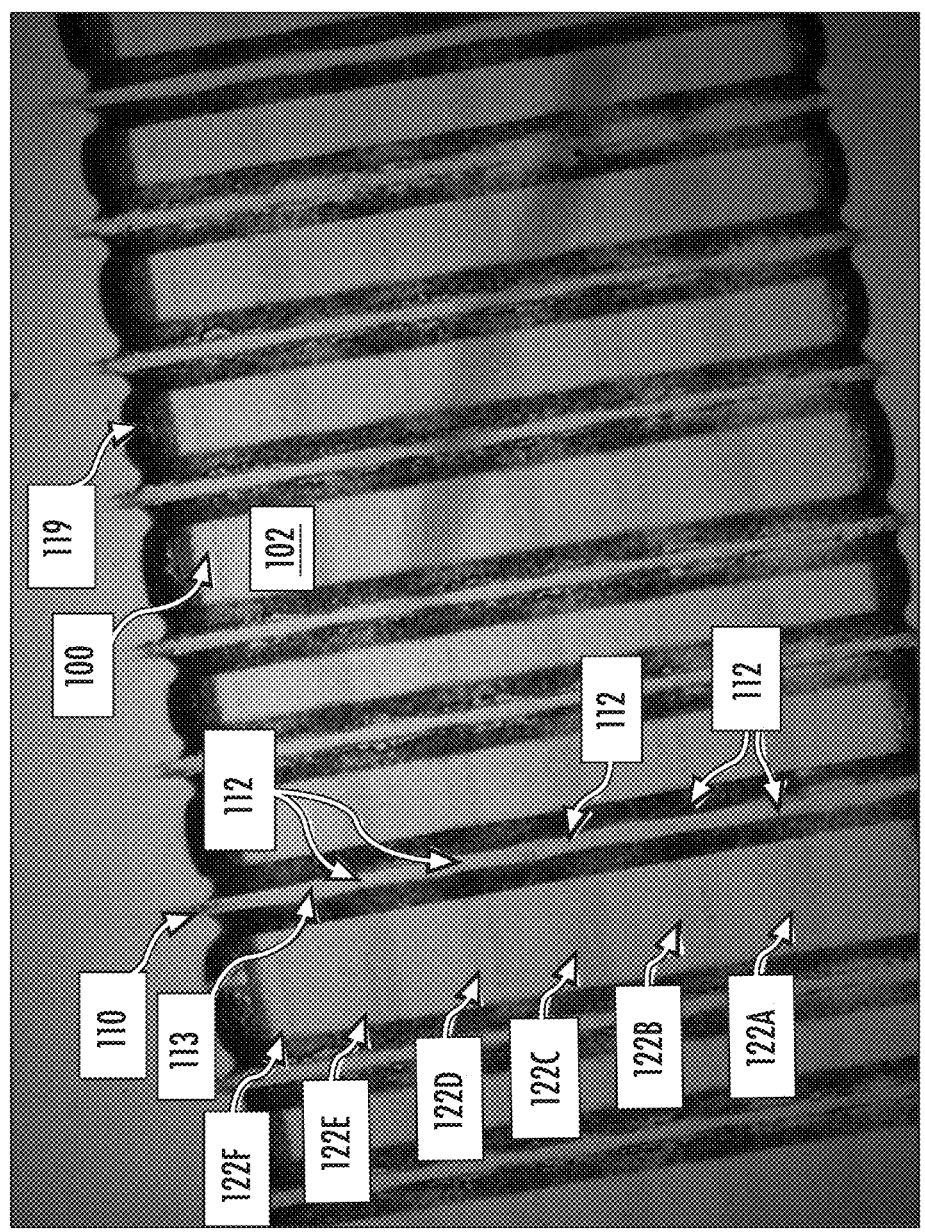
FIG. 6 is a microscope image of a plurality of curved optical elements bonded to a substrate by multiple passes of a laser beam according to one or more embodiments described and illustrated herein.

Referring now to FIG. 6, a microscope image of a plurality of optical elements 110 configured as optical fibers bonded to a first surface 102 of a substrate 100 is provided. It is noted that the dark regions 119 of the image is index matching fluid. The microscope image of FIG. 6 was taken by disposing the index matching fluid on the first surface 102 of the substrate 100 and then placing a glass substrate on top of the optical elements 110 such that the optical elements 110 and the index matching fluid was disposed between the substrate 100 and the glass substrate. In this manner, the optical elements 110 and their contact areas 113 become visible in the microscope image.

Figure 7:
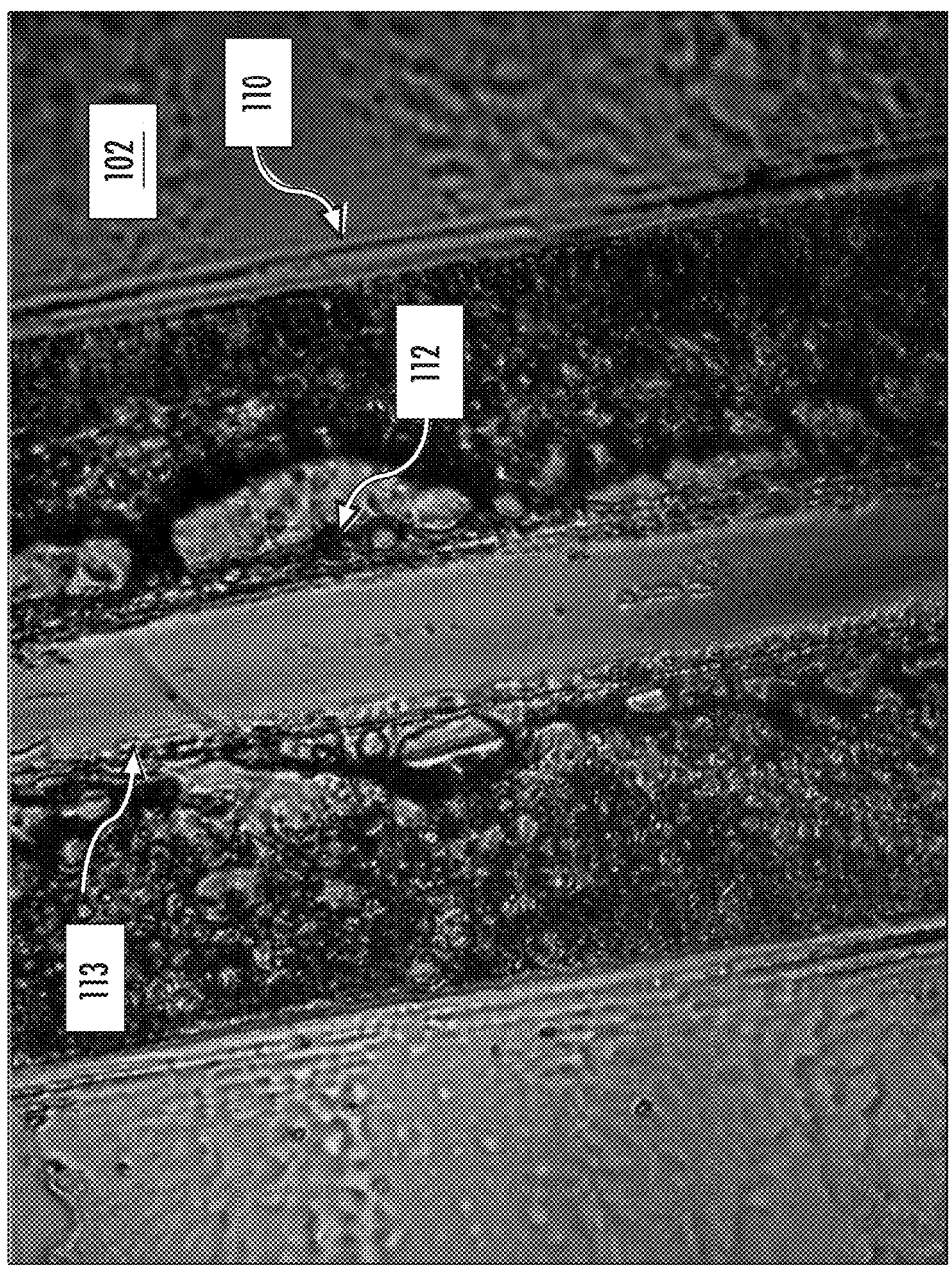
FIG. 7 is a microscope image of a bond area of an optical fiber bonded to a substrate according to one or more embodiments described and illustrated herein.

The substrate 100 shown in FIG. 6 is a 0.7 mm Corning® Eagle XG® glass substrate manufactured and sold by Corning Incorporated. The optical fibers are Corning® SMF-28® optical fibers. A 20 nm thick film layer of stainless steel is disposed on the first surface 102 of the substrate 100 to absorb the laser beam. The laser beam used to weld the optical fibers was a TEM 00 mode 355 nm wavelength laser beam having a power of 2.5 W and translated at a speed of 15 mm/s. Six passes 122A-122F of the laser beam were performed. The darker lines in the image show the path of the six passes 122A-122F. The distance between individual passes 122A-122F was about 0.2 mm. The laser beam 122 welds the optical elements 110 to the first surface 102 at the bond areas 112. It is noted that not all of the bond areas 112 are labeled in FIG. 6 for ease of illustration. FIG. 7 depicts a close-up microscope image depicting an individual bond area 112. FIG. 7 shows that there is minimal damage to the optical element 110 or the substrate 100 at the bond area.

In another example, a 1550-nm single-mode CW laser was used to weld the Corning® SMF-28® optical fibers to the Eagle XG® substrate with the 6 W laser power and 120 mm/s beam scanning speed.

Figure 8:
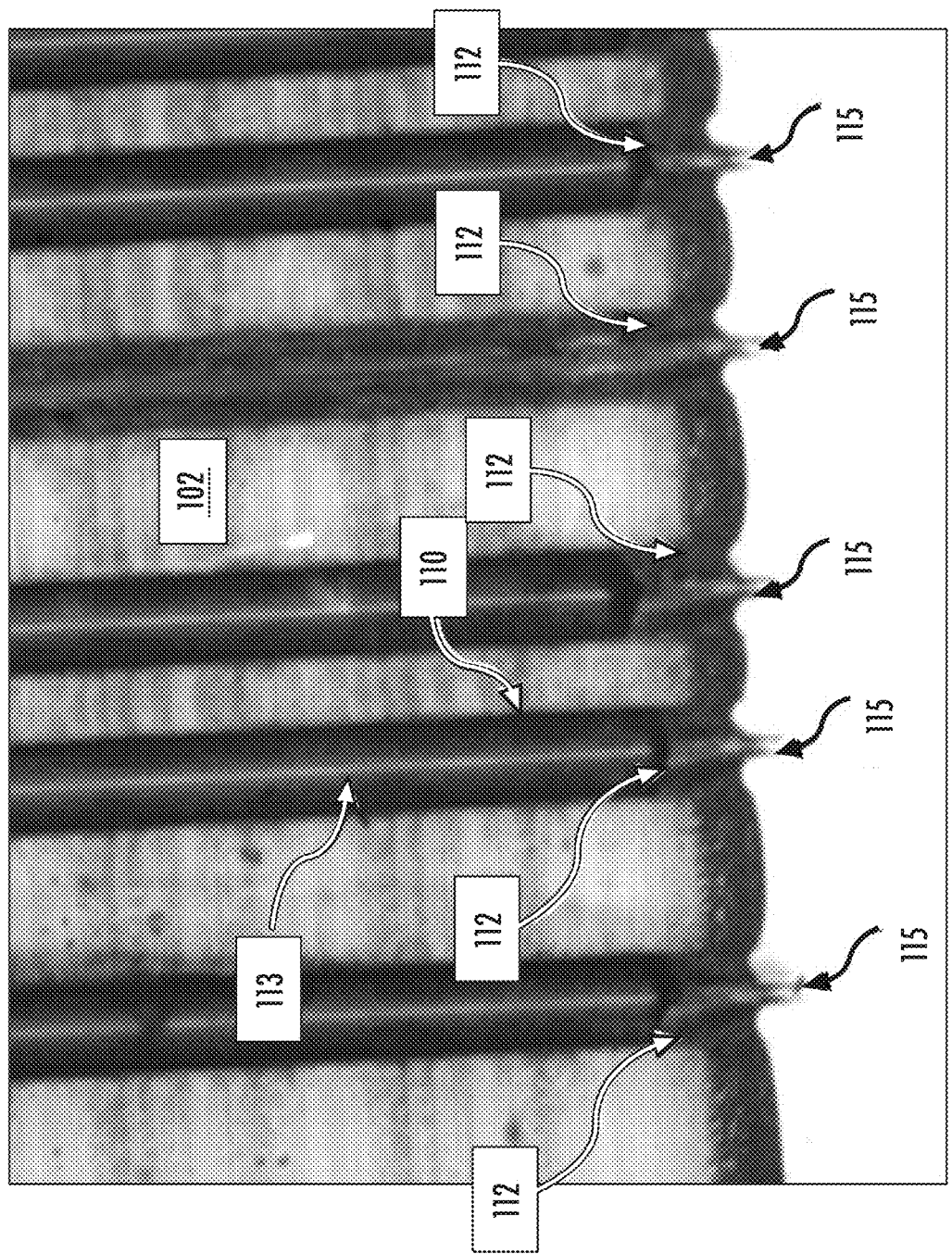
FIG. 8 is a microscope image of broken optical fibers bonded to a substrate by a laser beam illustrating a strength of bond areas that bond the optical fibers to the substrate according to one or more embodiments described and illustrated herein.

The resulting bonds of the optical elements 110 to the substrate 100 in the example depicted in FIGS. 6 and 7 are strong. FIG. 8 is a close-up microscope image of optical elements having broken ends 115 that were broken by lifting the optical elements off of the substrate 100. Rather than being lifted at the bond areas 112 where the optical elements 110 are bonded to the first surface 102 of the substrate 100, the optical elements 110 were broken along their length, which is indicative of the bonding strength of the laser processes described herein.

Additionally, it was found that the displacement of the center of the optical elements 110 at the bond areas was minimal. A Zygo interferometer was used to measure the surface topography of the substrate 100 under the optical elements 110 as well as the bottoms of the optical elements 110. Based on the analysis, the displacement of the centers of the optical elements 110 before bonding the optical elements 110 to the substrate 100 and after bonding the optical elements 110 to the substrate 100 is less than 0.2 μm at the bond areas. Thus, the optical elements 110 remain in substantially the same position after laser welding as before laser welding. Accordingly, the process will lead to increased optical coupling between the optical elements 110 of the connector and the waveguides to which the optical elements 110 are connected because the optical elements 110 are not vertically displaced after welding.

Figure 9:
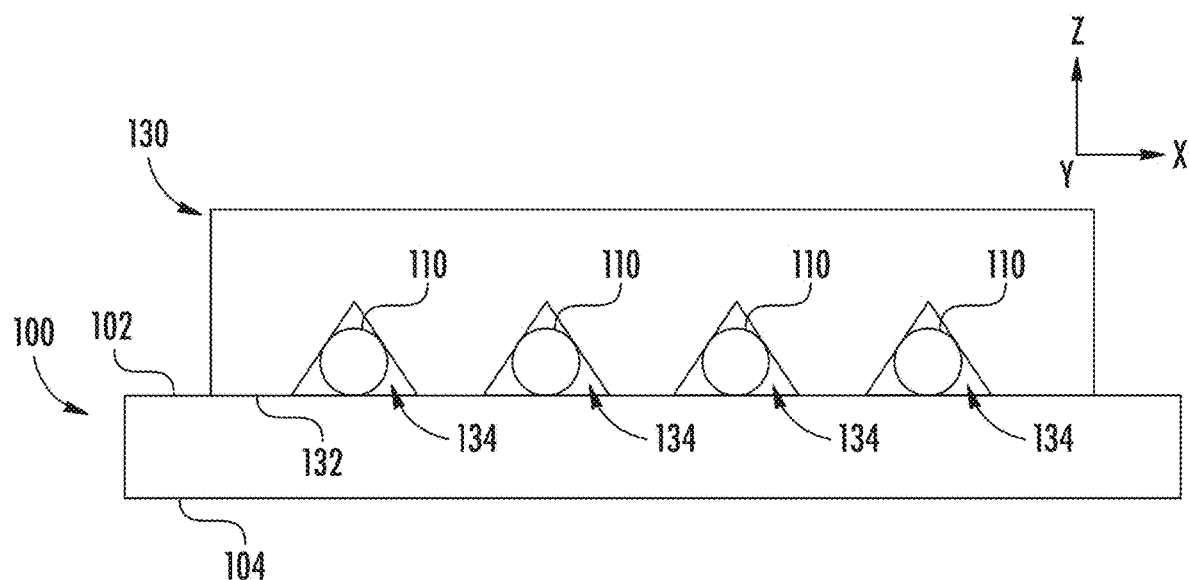
FIG. 9 schematically depicts an end view of a fixture securing a plurality of optical elements to a substrate prior to bonding the plurality of optical elements to the substrate by a laser beam according to one or more embodiments described and illustrated herein.
Figure 10:
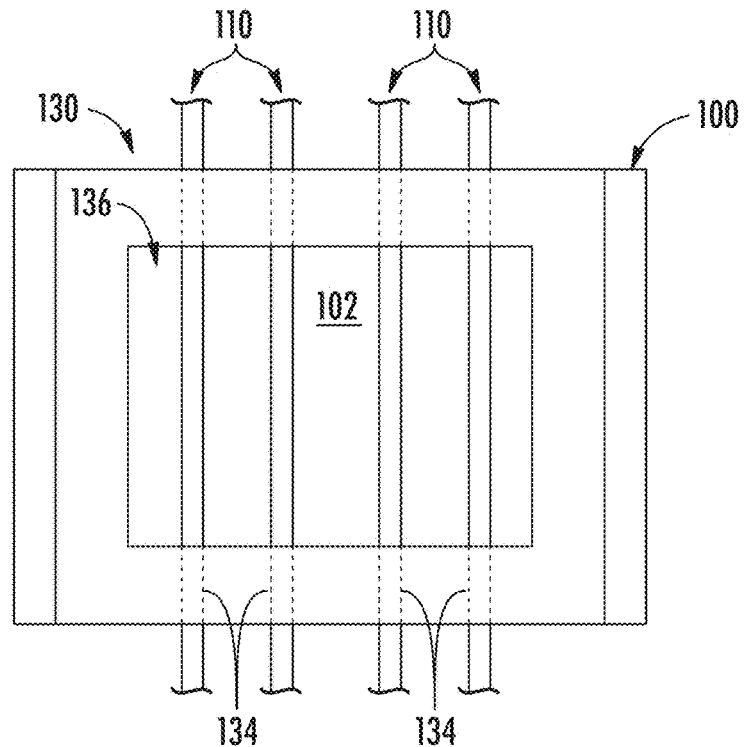
FIG. 10 schematically depicts a top down view of the fixture, the optical elements and the substrate depicted in FIG. 9 according to one or more embodiments described and illustrated herein.

Referring now to FIGS. 9 and 10, an example, non-limiting fixture utilized to maintain the optical elements in desired positions before the laser welding process. FIG. 9 is an end view of an assembly comprising a substrate 100, a plurality of optical elements 110, and a fixture 130. FIG. 10 is a top-down view of the assembly depicted in FIG. 9. The fixture 130 may be fabricated from any suitable material, such as glass, metal or polymers, for example.

As shown in FIG. 10, the fixture has a bottom surface 132 having a plurality of grooves 134. The fixture 130 is placed on the substrate 100 such that the bottom surface 132 of the fixture 130 contacts the first surface 102 (and/or the second surface) or any film layers that are disposed on the first surface 102. The fixture 130 is placed such that the plurality of optical elements 110 is positioned within the plurality of grooves 134. The plurality of grooves 134 of the fixture 130 positions the plurality of optical elements 110 at known locations on the x- and z-axis. As a non-limiting example, the precise placement of the fixture 130 on the substrate 100 may be performed by an active alignment process. Once in place, the fixture 130 may be mechanically clamped or otherwise secured to the substrate 100.

Referring now to FIG. 10, the fixture 130 has an open region 136 that exposes the optical elements 110. The plurality of grooves 134 is interrupted by the open region 136. Thus, the laser beam 120 enters through the open region 136 and may pass over (or be translated across) the exposed optical elements 110 to weld the optical elements 110 to the substrate 100. As shown in FIG. 5, multiple passes of the laser beam 120 may be provided in the open region 136 to bond the optical elements 110 to the substrate at multiple bond areas. After the optical elements are bonded to the substrate 100, the fixture 130 may be removed from the substrate 100 and the assembly may be further processed.

Optical elements described herein may be planar optical elements, such as planar optical waveguides, optical filters (e.g., polarizing filters, wavelength filters), active optical components (e.g., lasers, light emitting diodes, photodiodes, and the like), wavelength multiplexers, and wavelength de-multiplexers. Such planar optical elements may be bonded to a flat substrate using a laser process that melts one or more of the material of the planar optical element and the substrate.

Figure 12:
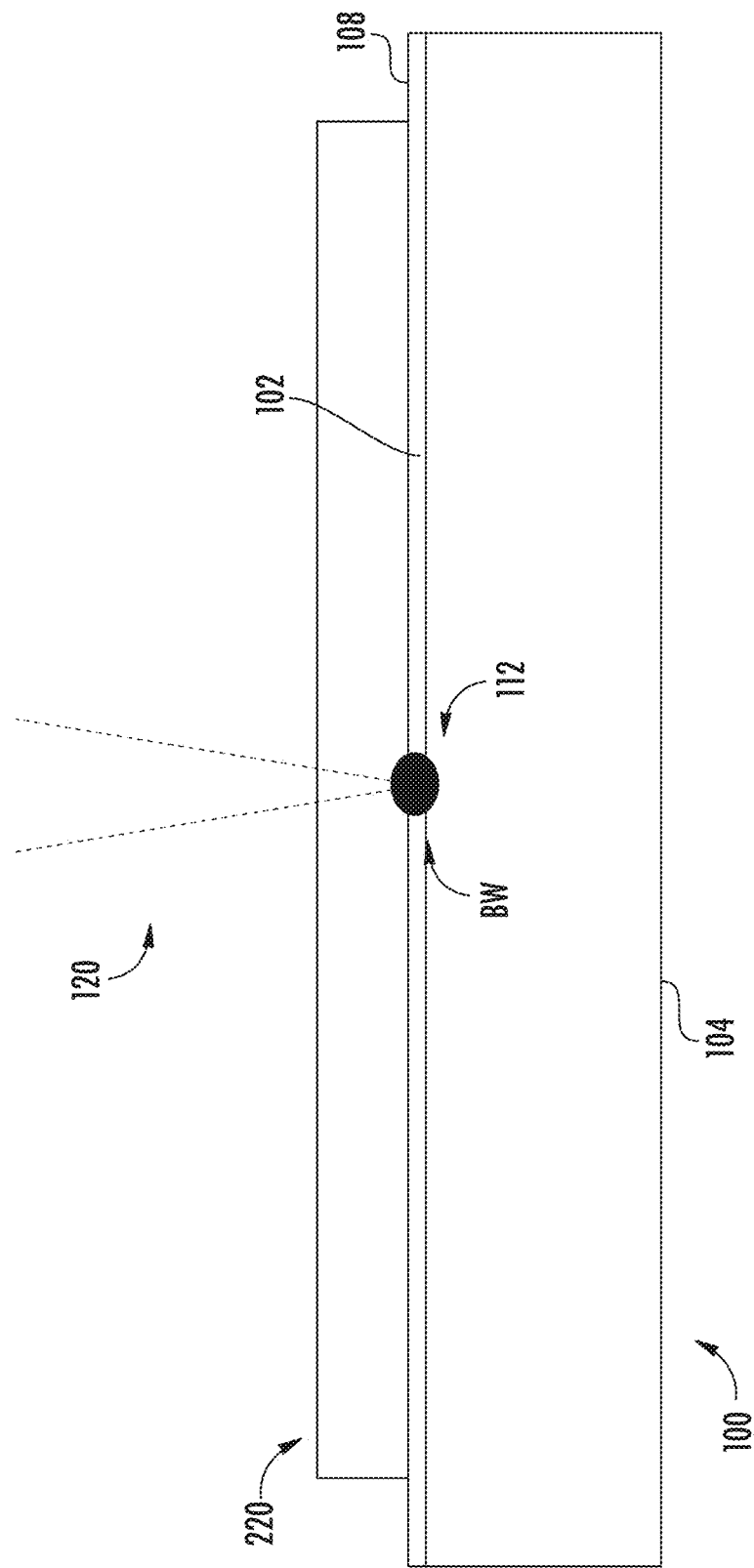
FIG. 12 schematically depicts an end view of a planar optical element positioned on a film layer disposed on a surface of a substrate for laser bonding the planar optical element to the substrate according to one or more embodiments described and illustrated herein.

Referring now to FIG. 12, an example process of bonding a planar optical element 210 to a substrate 100 is schematically illustrated. In the illustrated embodiment, a film layer 108 is deposited on a surface 102 of the substrate 100. The film layer 108 may be fabricated from a material capable of absorbing radiation at the wavelength of a laser beam 120, as described above. The planar optical element 210 is then disposed on the film layer 108. Use of the film layer 108 may increase the amount of heat generated by the laser beam 120 to ensure that the material of the planar optical element 210 and/or the substrate 100 sufficiently melts to bond the two components together as described above.

The material of the planar optical element 210 and the substrate 100 may be one or more inorganic materials that are dissimilar to one another, or the two components may be fabricated from the same material(s). However, the softening point of at least one of the materials of the planar optical element 210 and the substrate 100 should be such that it is in a temperature range that can be achieved by interfacial absorption properties at the location where incidence laser light is delivered from the laser beam 120. The material of the substrate 100 may be as described above (e.g., glass, silica, and silicon). In another example, the substrate 100 may be another planar optical element itself. Thus, the laser bonding techniques described herein may be used to join two optical elements. As a non-limiting example, the planar optical element may be a wavelength division multiplexing chip and the substrate 100 may be configured as an optical filter. In another example, the planar optical element 210 may be a silicon photonics chip that is bonded to a substrate 100 configured as an optical waveguide substrate having embedded waveguides for optical connection to optical fibers. It should be understood that other optical elements may be joined using the laser bonding techniques described herein.

As shown in FIG. 12, a laser beam 120 is focused onto the film layer 108, which absorbs the laser beam 120 and generates heat to melt the material of the planar optical element 210 and/or the substrate 100. The laser beam 120 may be a continuous wavelength (CW) laser beam or a quasi-CW laser beam operating at a wavelength and power capable of melting at least one of the planar optical element 210 and the substrate. The laser beam 120 should be such that the laser beam 120 is absorbed by the film layer 108 to melt the material of the substrate 100. For example, the wavelength of the laser beam 120 may be in the visible, ultraviolet or near infrared spectral bands. As a non-limiting example, the wavelength of the laser beam 120 may be within a range of about 0.3 to about 1.7 µm, including endpoints. In some embodiments, a single mode laser source is used to generate the laser beam 120 and the laser beam 120 may be in a range of about 0.5 W to about 10 W including endpoints. An optical set-up (not shown) may be used to focus the laser beam 120 such that a beam waist BW (i.e., the narrowest part of the focused laser beam 120) is located at or within the film layer 108.

In cases where the laser beam 120 is a pulsed laser beam, the film layer 108 may not be utilized. For example, a laser beam 120 having a pulse duration of less than or equal to 10 ps may heat the material of the planar optical element 210 and/or the substrate 100 by multiphoton absorption, and thus laser welding can be achieved without the film layer 108.

As described above with respect to FIGS. 1-5, the laser beam 120 laser welds the planar optical element 210 to the substrate 100. The laser welding process may be used to fabricate optical assemblies. Adhesives such as epoxies have a high CTE, which may cause optical elements to shift during manufacturing processes (e.g., solder reflow) or during periods of high operating temperatures. The laser welding techniques described herein may be used in lieu of the use of adhesives. Alternatively, relatively weak laser bonds may be formed between optical elements and substrates such that the laser bonds are just strong enough for material handling and storage. Subsequently, an adhesive may be applied during a downstream processing step. In some embodiments, the adhesive may be mainly responsible for securing the optical elements to the substrate in the overall assembly. However, the laser bonds may inhibit displacement in three dimensions due to environmental temperature and humidity variability.

Further, the laser bonding techniques may bond optical elements in place during active or passive alignment when assembling optical components. For example, epoxy may cause optical elements to shift causing misalignment during curing. Epoxy also takes time to cure, thereby slowing down the assembly process. The laser bonding techniques do not suffer from misalignment and shifting, and do not require waiting for epoxy to cure before moving on to subsequent processing steps. Such laser bonding techniques may be particularly useful in the assembly of photonics components which typically require active alignment (e.g., by use of a vision system) and fixing the alignment between components accurately and quickly.

The laser welding may be applied not just between the planar optical element and a flat substrate, but also between optical elements themselves, thereby making an array of pre-aligned elements possible. The handling of individual parts due to small size may be challenging; however, if a larger number of elements is being used, these smaller components can be pre-aligned and joined together making one larger part, which may be easier to handle.

Figure 13A:
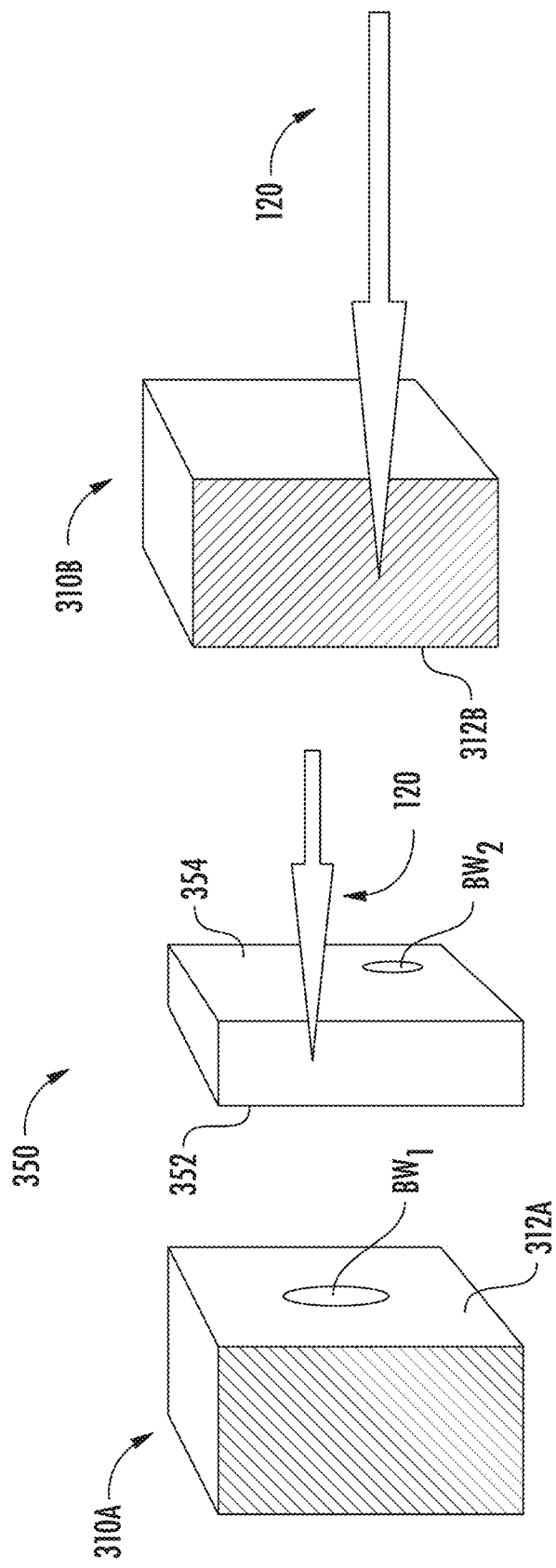
FIG. 13A schematically depicts an exploded view of an example optical assembly comprising a spacer disposed between two planar optical elements according to one or more embodiments described and illustrated herein.
Figure 13B:
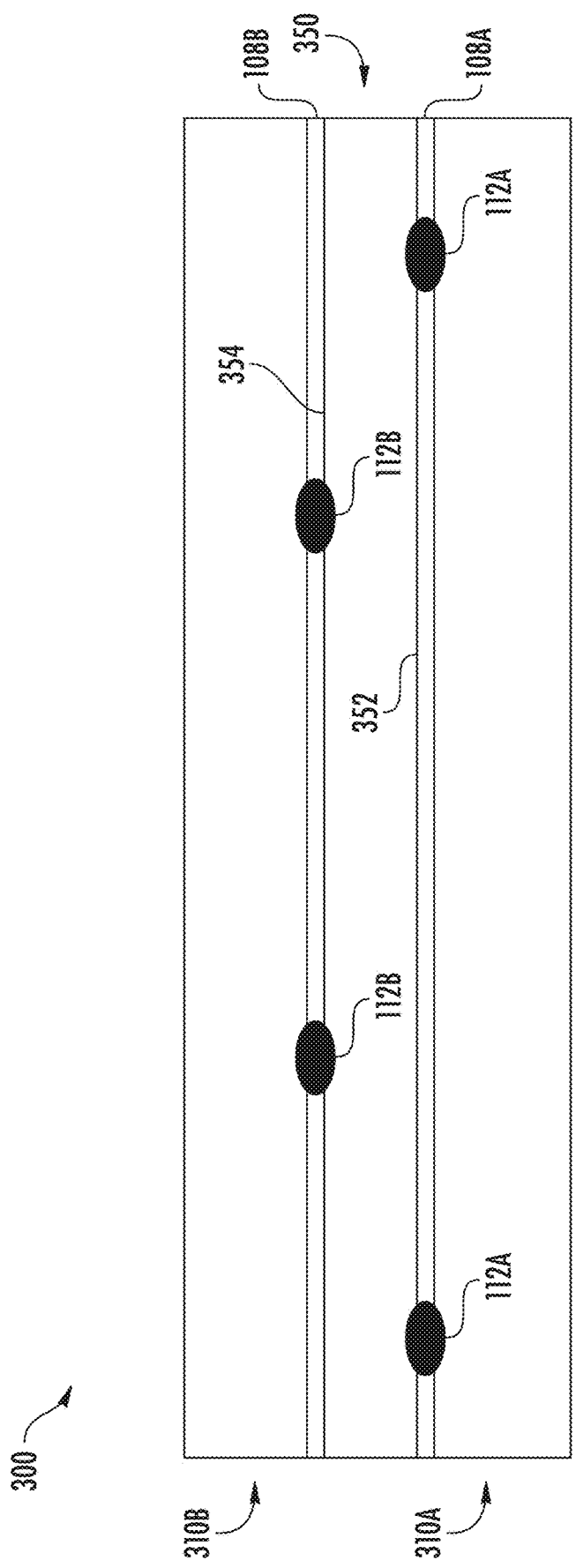
FIG. 13B schematically depicts an assembled view of an example optical assembly comprising a spacer disposed between two planar optical elements according to one or more embodiments described and illustrated herein.

The concept a pre-aligning and joining multiple planar optical elements 310A, 310B is illustrated by FIGS. 13A and 13B. FIG. 13A shows first and second planar optical elements 310A, 310B prior to bonding. FIG. 13B shows an optical assembly 300 comprising the first and second planar optical elements 310A, 310B. The first and second planar optical elements 310A, 310B may be any appropriate optical components. In a non-limiting example, the first and second planar optical elements 310A, 310B are wavelength division multiplexing (WDM) filters.

In the illustrated embodiment, the individual first and second planar optical elements 310A, 310B are joined together by a spacer 350 with parallel surfaces 352, 354. The spacer 350 has a first and second film layer 108A, 108B in the form as a coating on each surface 352, 354, respectively (FIG. 13B). Alternatively, the first and second film layers 108A, 108B may be discrete film layers and not a coating, or a coating on the first and second planar optical elements 310A, 310B. The assembly is performed layer by layer so the laser beam 120 has easy access to the interface between the spacer 350 and the first and second planar optical elements 310A, 310B.

The first planar optical element 310A is attached to a first spacer 350 such that a first film layer 108A is adjacent a surface 312A of the first planar optical element 310A. The film layer 108B on an entry surface 354 of the spacer 350 is removed by the incident laser beam 120. Then a beam waist $BW_1$ is provided by the laser beam at the interface between the first film layer 108A and the surface 312A of the first planar optical element 310A. As shown in FIG. 13B, one or more first bond areas 112A bond the first planar optical element 310A to the spacer 350.

Then, the second planar optical element 310B is disposed on a second surface 354 of the spacer 350. The laser beam 120 produces a beam waist $BW_2$ at the interface between the second film layer 108B and the surface 312B of the second planar optical element 310B at a section where the second film layer 108B is still intact (i.e., where the second absorbing coating 108B was not removed by bonding the first planar optical element 310A to the spacer 350). The result is one or more second bond areas 112B that bond the second planar optical element to the spacer 350. Thus, an optical assembly 300 comprising the first planar optical element 310A, the spacer 350, and the second planar optical element 310B is formed. It should be understood that additional spacers 350 and additional planar optical elements (and even curved optical elements) may be attached in a stacked relationship. The stacked array may then be aligned into a final device.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A method of bonding an optical element to a substrate, the method comprising:
   disposing a film layer on a surface of the substrate;
   disposing the optical element on a surface of the film layer;
   directing a laser beam into the optical element; and
   melting, using the laser beam that was directed into the optical element, a material of the substrate to create a bond area between the optical element and the surface of the substrate, wherein the film layer is capable of absorbing a wavelength of the laser beam to melt the material of the substrate at the bond area, and the bond area comprises laser-melted material of the substrate that bonds the optical element to the substrate.

2. The method of claim 1, wherein the optical element is a curved optical element.

3. The method of claim 2, wherein the curved optical element comprises a curved surface that focuses the laser beam to a focused diameter that is smaller than an initial diameter of the laser beam when the laser beam entered the optical element.

4. The method of claim 1, wherein the optical element is one of an optical fiber, a gradient-index lens, a cylindrical waveguide, a concave lens, and a convex lens.

5. The method of claim 1, wherein a displacement of a center of the optical element before bonding the optical element to the substrate and after bonding the optical element to the substrate is less than or equal to about 0.2 µm.

6. The method of claim 1, further comprising locating a focal point of the laser beam on the surface of the substrate.

7. The method of claim 1, further comprising:
   translating the laser beam or the substrate in a first direction transverse to a longitudinal axis of the optical element such that the laser beam passes over the optical element to form the bond area;
   then shifting a position of the laser beam or the substrate in a direction parallel to the longitudinal axis of the optical element; and
   then translating the laser beam or the substrate in a second direction transverse to the longitudinal axis of the optical element.

8. The method of claim 7, further comprising placing one or more additional optical elements on the surface of the substrate.

9. The method of claim 8, further comprising translating the laser beam or the substrate in the first direction such that the laser beam passes over the one or more additional optical elements.

10. The method of claim 1, further comprising, prior to directing the laser beam into the optical element, placing a fixture on the surface of the substrate, wherein the fixture comprises a groove and an open region, and wherein the fixture is placed on the surface of the substrate such that the optical element is disposed within the groove.

11. The method of claim 10, further comprising translating the laser beam or the substrate such that the laser beam enters through the open region and passes over the optical element.

12. The method of claim 1, further comprising utilizing a single mode laser source to generate the laser beam, wherein the laser beam has an optical power within a range of 2 W to 10 W.

13. The method of claim 1, wherein a diameter of the laser beam is between 80 µm and 400 µm.

14. The method of claim 1, further comprising pulsing the laser beam with a pulse duration less than 1 picosecond.

15. The method of claim 1, wherein the optical element is a planar optical element.

16. The method of claim 15, wherein the planar optical element is one of a waveguide substrate, an optical filter and an active optical component.

17. The method of claim 15, wherein the planar optical element is one of a wavelength division multiplexing chip and an optical filter and the substrate is the other of the wavelength division multiplexing chip and the optical filter.

18. The method of claim 15, wherein:
   the substrate is a spacer comprising a first surface and a second surface; the film layer comprises a first film layer on the first surface of the spacer and a second film layer on the second surface of the spacer;
   the planar optical element is a first planar optical element that is disposed on the first film layer; and
   directing the laser beam into the planar optical element comprises passing the laser beam through the second film layer at a first location such that a beam waist of the laser beam formed at the first film layer creates a first bond area between the first planar optical element and the first surface of the spacer.

19. The method of claim 18, further comprising:
   disposing a second planar optical element on the second film layer; and
   directing the laser beam to form a beam waist at the second film layer at a location other than the first location such that the beam waist of the laser beam at the second film layer creates a second bond area between the second planar optical element and the second surface of the spacer.

20. The method of claim 1, further comprising applying an adhesive to the optical element and the substrate after directing the laser beam into the optical element.

21. A method of bonding a gradient-index (GRIN) lens to a substrate, the method comprising:
   disposing a film layer on a surface of the substrate;
   disposing the GRIN lens on a surface of the film layer;
   directing a laser beam into the GRIN lens, wherein the GRIN lens comprises a curved surface and the curved surface focuses the laser beam to a focused diameter that is smaller than an initial diameter of the laser beam when the laser beam entered the GRIN lens; and
   melting, using the focused diameter laser beam, a material of the substrate to create a bond area between the GRIN lens and the surface of the substrate, wherein the film layer is capable of absorbing a wavelength of the laser beam to melt the material of the substrate at the bond area, and the bond area comprises laser-melted material of the substrate that bonds the GRIN lens to the substrate.

22. The method of claim 21, further comprising utilizing a single mode laser source to generate the laser beam, wherein the laser beam has an optical power within a range of 2 W to 10 W.

\* \* \* \* \*

UNITED STATES PATENT AND TRADEMARK OFFICE
CERTIFICATE OF CORRECTION

PATENT NO. : 10,746,937 B2
APPLICATION NO. : 16/663917
DATED : August 18, 2020
INVENTOR(S) : Butler et al.

It is certified that error appears in the above-identified patent and that said Letters Patent is hereby corrected as shown below:

On the Title Page

Item (72), should read:
Douglas Llewellyn Butler, Painted Post, NY (US);
Stephan Lvovich Logunov, Corning, NY (US);
Mark Alejandro Quesada, Horseheads, NY (US);
Alexander Mikhailovich Streltsov, Corning, NY (US);
James Scott Sutherland, Painted Post, NY (US);
Qi Jun Xiao, Freemont, CA (US)

Signed and Sealed this
Tenth Day of November, 2020

Andrei Iancu
*Director of the United States Patent and Trademark Office*